United States Patent [19]
O'Donnell

[11] Patent Number: 6,052,496
[45] Date of Patent: Apr. 18, 2000

[54] INTEGRATED OPTICAL MODULATORS

[75] Inventor: Adrian Charles O'Donnell, Chelmsford, United Kingdom

[73] Assignee: Integrated Optical Components Limited, Essex, United Kingdom

[21] Appl. No.: 08/952,710

[22] PCT Filed: May 17, 1996

[86] PCT No.: PCT/GN96/01184

§ 371 Date: Nov. 17, 1997

§ 102(e) Date: Nov. 17, 1997

[87] PCT Pub. No.: WO96/36901

PCT Pub. Date: Nov. 21, 1996

[30] Foreign Application Priority Data

May 18, 1995 [GB] United Kingdom ............. 95 10051

[51] Int. Cl.$^7$ .................................................. G02F 1/035
[52] U.S. Cl. ................................. 385/3; 385/2; 359/245; 359/254
[58] Field of Search ........................ 385/2, 3; 359/245, 359/254

[56] References Cited

U.S. PATENT DOCUMENTS

| | | | |
|---|---|---|---|
| 5,050,948 | 9/1991 | Hawkins, III et al. | 385/2 |
| 5,408,544 | 4/1995 | Seino | 385/3 |

FOREIGN PATENT DOCUMENTS

| | | | |
|---|---|---|---|
| 0 233 797 | 8/1987 | European Pat. Off. | 385/3 |
| 2-269309 | 11/1990 | Japan | 385/3 |
| 2270173A | 3/1994 | United Kingdom | 385/2 |
| WO 89/10577 | 11/1989 | WIPO | 385/2 |

*Primary Examiner*—Georgia Epps
*Assistant Examiner*—Margaret Burke
*Attorney, Agent, or Firm*—McGlew and Tuttle, P.C.

[57] ABSTRACT

An integrated optical modulator of the Mach-Zehnder type has a waveguide which, for part of its length, is divided into two waveguide sections (11, 12) arranged logically in parallel. Incoming light is divided to pass along the two sections (11, 12) and is then recombined before leaving the modulator. Each waveguide section has a pair of electrodes (13, 14) and (14, 15) associated therewith to generate an electric field through which the respective waveguide section passes, though there may be a single electrode (14) between the two waveguide sections (11, 12) to serve as one electrode of each pair, with the other electrode of each pair commoned. The physical arrangement of one waveguide section (11) and its associated electrodes (13, 14) is different from that of the other waveguide section (12) and its associated electrodes (14, 15), such that the electric fields to which light propagated along the two waveguide sections (11, 12) are respectively subjected are different when a single driving voltage is applied to the electrodes (13, 14, 15) associated with the waveguide sections. In an alternative arrangement there is provided an amplitude modulator (30) followed by a phase modulator (31).

13 Claims, 2 Drawing Sheets

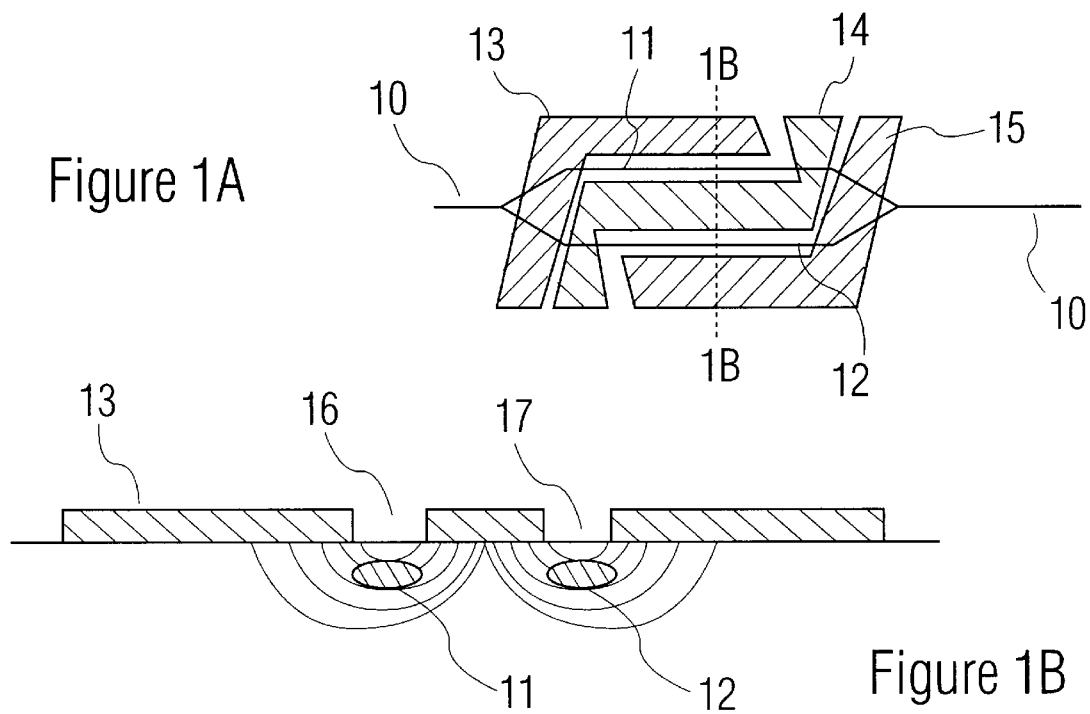
Figure 1A
Figure 1B
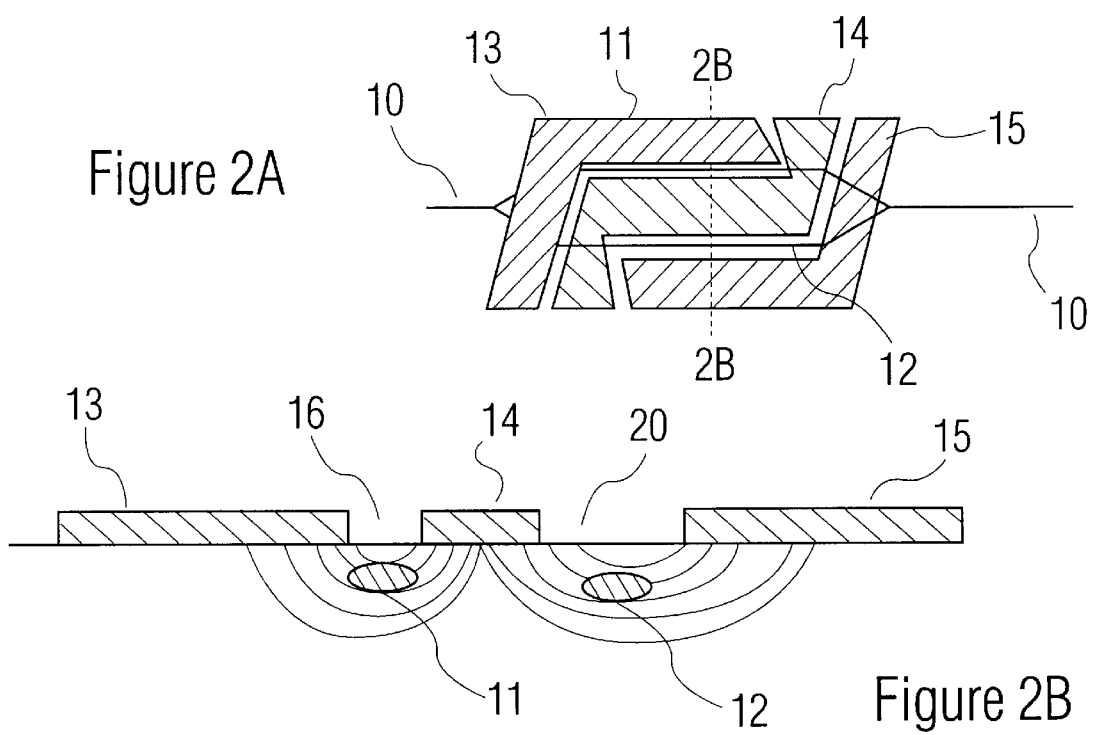
Figure 2A
Figure 2B

INTEGRATED OPTICAL MODULATORS

FIELD OF THE INVENTION

This invention relates to integrated optical modulators, and also to methods of operating integrated optical modulators.

BACKGROUND OF THE INVENTION

In the telecommunications industries, there is a demand for ever-increasing rates of data transmission. Optical communication networks are being used on an increasing scale on account of their ability to carry much higher data rates than electrical links, and various improvements are constantly being developed to allow optical data links to handle higher and higher data transmission rates. Unfortunately, the higher the data transmission rate, the shorter the maximum possible length of a data link, before regeneration of the data signal is required.

Currently, terrestrial telecommunications networks are being designed with a data rate of 2.5 Gb/s over 400 km, and 10 Gb/s over 100 to 150 km. Recently, there has been the introduction of optical amplifier components such as erbium-doped fibre amplifiers. These have allowed system designers to extend the physical length of an optical link before electrical regeneration is necessary.

Generally, the limiting factor for the length of a link is chromatic dispersion, which occurs because a transmitter has a real optical linewidth and the refractive index of a fibre varies, dependent upon wavelength. The optical fibres along which the data is transmitted have already been deployed extensively and so the system constraints are transferred into the transmitter design. For a given transmitter, the optical linewidth is determined by two factors, these being the inherent linewidth at DC and the broadening of the linewidth introduced by modulation. The latter factor is referred to as static chirp. In addition, individual components may introduce a shift to the centre-frequency of the optical linewidth; this effect is usually referred to as dynamic chirp.

The modulation of an optical signal results in optical harmonics of the modulation frequency about the carrier frequency. If this modulated light is passed through a length of fibre which exhibits chromatic dispersion (that is, the fibre refractive index varies with wavelength), the phase of the light at the distal end of a fibre varies as a function of its frequency Detection of received light causes mixing of the various frequency components, but as these will have differing phases, the mixing will result in the amplitude of the detected signal being changed on account of the linewidth of the transmitted signal.

As a result of static and dynamic chirp, there is introduced into an optically modulated and transmitted signal a pulse width change and an amplitude shift. In the case of the former, higher frequencies are reduced in amplitude and at some combinations of link length, dispersion and frequency, the signal to be detected can be nulled completely. In the case of the latter, positive dynamic chirp will broaden the width of a pulse propagating down a fibre and negative dynamic chirp will narrow the pulse Either of these effects, if sufficiently large, will render a modulated signal undetectable.

With increasing speeds of transmission, it is important that a transmitter can achieve a defined and reproducible level of dynamic chirp. In order to maximise the repeater spacing, transmitters are being specified with a single value of dynamic chirp, with a specified tolerance. There is thus a demand for a modulator able to introduce a specified level of dynamic chirp into a modulated signal.

SUMMARY AND OBJECTS OF THE INVENTION

According to one aspect of the present invention, there is provided an integrated optical modulator having an optical waveguide which, for part of its length, is divided into two waveguide sections arranged logically in parallel whereby incoming light is divided into the waveguide sections and is then recombined after passing therealong, a pair of electrodes for each waveguide section arranged with a respective gap between the electrodes of each pair whereby respective electric fields may be generated and through which the respective waveguide sections extend, one of the gap between the respective electrodes of each pair thereof and the physical disposition of the waveguide sections relative to the respective gaps differing such that the electric fields to which light propagated along the two waveguide sections are subjected are different when the pairs of electrodes are driven with substantially the same voltage.

The term "logically in parallel", as used herein is intended to refer to the logical arrangement of the waveguide sections (i.e. not in series) rather than their physical arrangement. Thus, the waveguide sections may be linear and physically parallel, but other physical arrangements of the waveguide sections are equally possible.

In the present invention, the waveguide sections and the associated electrodes of a modulator have physically differing configurations in order to introduce an imbalance between the two arms of the modulator. This is achieved by dividing an optical signal to pass along the two sections and subjecting the divided signal to different electric fields, so giving a different phase shift in the two arms. Consequently, upon recombination of the optical signals after passing along the waveguide sections, the resultant modulated signal will display chirp, the value of which will be dependent upon the chosen physical arrangement.

A typical integrated optical modulator is arranged as a Mach-Zehnder modulator having, for each waveguide section, a pair of electrodes between which there is defined a gap along which extends the associated waveguide section. The waveguide itself usually is formed in a substrate by a doping technique well known in the integrated circuit art. Equally, the formation of electrodes on that substrate is also well known in this art.

In a typical modulator as just described, there may be a single electrode between the two waveguide sections, which single electrode serves as one of the electrodes for each of the two electrode pairs. If the other electrodes of each electrode pair are connected together, a single drive voltage may be applied across the single electrode and said other electrodes, and yet the component will still produce a defined level of chirp. This may be contrasted with other designs of component intended to produce defined levels of chirp, where separate drive sources have to be provided for each arm of an interferometer, in order to introduce a relative phase shift between the two arms.

In one possible form of the present invention, the arrangement of the pair of electrodes associated with one waveguide section differs from the arrangement of the electrodes of the other waveguide section. For example, the gap between the two electrodes of one pair may be different from the gap between the electrodes of the other pair, whereby different electric fields are generated between the respective pairs of electrodes, for a common driving voltage. Alternatively, the arrangement of the pairs of the electrodes and the gaps therebetween may be essentially the same, but the disposition of each waveguide section with respect to its associated gap may be different, for the two waveguide sections. In this case, one waveguide section may be offset laterally with respect to its associated electrodes, whereby that waveguide section will lie in a marginal region of the electric field between the electrodes, whereas the other waveguide section may be disposed substantially centrally with respect to the gap between its associated electrodes. Yet another possibility is to have the optical mode sizes (that is, in effect the cross-sectional areas) of the two waveguide sections different from each other.

In all of the above cases, the two waveguide sections and the electrodes are arranged as a Mach-Zehnder interferometer, to perform amplitude modulation on an incoming signal. The incoming light is divided into the two waveguide sections and then is subjected to a phase shift consequent upon the electric field through which the waveguide sections pass, which fields are generated by the electrodes associated with the respective sections. Then, on recombining the light, the two light portions will interfere to produce fringes resulting in a modulated optical signal. By adopting the measures defined in this invention, the precise nature of that interference will be affected, so resulting in a controlled degree of chirp, for a given modulator.

According to a further aspect of the present invention, there is provided a method of controlling the chirp of an integrated optical modulator having an optical waveguide which, for part of its length, is divided into two waveguide sections arranged logically in parallel so that incoming light is divided into the waveguide sections and then is recombined after passing therealong, each waveguide section having a respective pair of electrodes associated therewith and having a respective gap therebetween to generate an electric field through which the respective waveguide section extends, one of the gap between the respective electrodes of each pair thereof and the physical disposition of the waveguide sections relative to the respective gaps differing, in which method both pairs of electrodes are driven with the substantially same voltage but the two waveguide sections being subjected to different electric fields having regard to the differing arrangement of the waveguide sections and the electrodes associated therewith.

By way of example only, certain specific embodiments of modulator constructed and arranged in accordance with the present invention will now be described in detail.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Accompanying drawings, in which:

FIGS. 1A and 1B diagrammatically illustrate a known form of Mach-Zehnder modulator in plan and cross-section, the section line 1B—1B being marked on FIG. 1A;

FIGS. 2A and 2B diagrammatically illustrate a first embodiment of modulator of the present invention.

DESCRIPTION OF THE PREFERRED EMBODIMENT

Figure 3A:
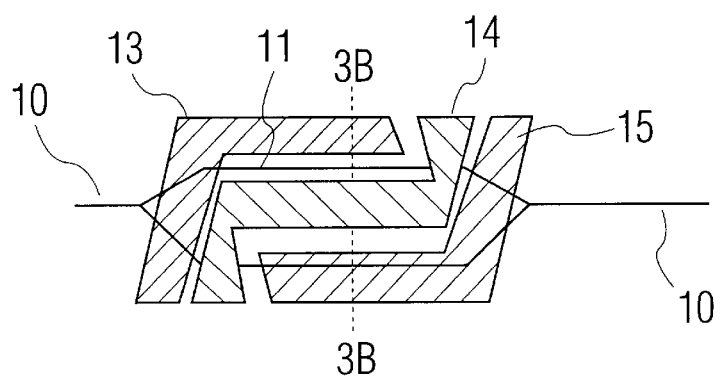
FIGS. 3A and 3B are similar to FIGS. 2A and 2B, but of a second embodiment of modulator of the present invention.

Referring initially to FIGS. 1A and 1B, there is shown diagrammatically a Mach-Zehnder type of integrated optical amplitude modulator fabricated using conventional integrated circuit techniques but configured to allow the propagation of light along waveguides formed in a substrate typically of lithium niobate. The waveguide 10 is divided into two waveguide sections 11 and 12 arranged in parallel, such that an incoming light wave is split into the two waveguide sections, and then recombined so as to cause interference fringes.

On the substrate, there are formed electrodes 13, 14 and 15 arranged in two pairs with respective gaps 16 and 17 therebetween, the central electrode 14 being common to each of the two pairs. The outer two electrodes 13 and 15 are electrically connected together, in order that the same electric field will exist between the two pairs of electrodes, as shown in FIG. 1B, for a single driving signal applied across the central electrode 14 and the common outer electrodes 13 and 15.

The arrangement illustrated in FIGS. 1A and 1B is essentially symmetrical, in order that each waveguide section 11 and 12 is subjected to the same electric field, when the same driving voltage is applied to the electrodes. Such an arrangement gives rise to zero dynamic chirp, unless only one electrode pair is driven, in which case there will be ±1 chirp. With this arrangement, no other chirp values can be obtained.

In the following description of specific embodiments of the present invention, components which are essentially the same as those described above with reference to FIGS. 1A and 1B are given like reference characters.

FIGS. 2A and 2B show a first embodiment of the present invention, wherein the physical arrangement determines the chirp of the resultant modulated waveform, when a single driving voltage is applied across electrode 14 and common electrodes 13 and 15, associated with the two waveguide sections 11 and 12. This is obtained by imbalanced modulation, by providing an enlarged gap 20 between electrodes 14 and 15, as compared to the gap 16 between electrodes 13 and 14, this gap 16 being comparable to that of the known arrangement of FIGS. 1A and 1B. The enlarged gap between electrodes 14 and 15 gives rise to an electrical field of a different configuration as compared to the field generated by electrodes 13 and 14. Thus, the two waveguide sections 11 and 12 are subject to different electric fields and light passing along the two waveguide sections 11 and 12 undergo different phase shifts, resulting in non-zero, non-unity chirp, as compared to the known arrangement of FIGS. 1A and 1B. The chirp is however defined, fixed and repeatable, for that modulator.

Figure 3B:
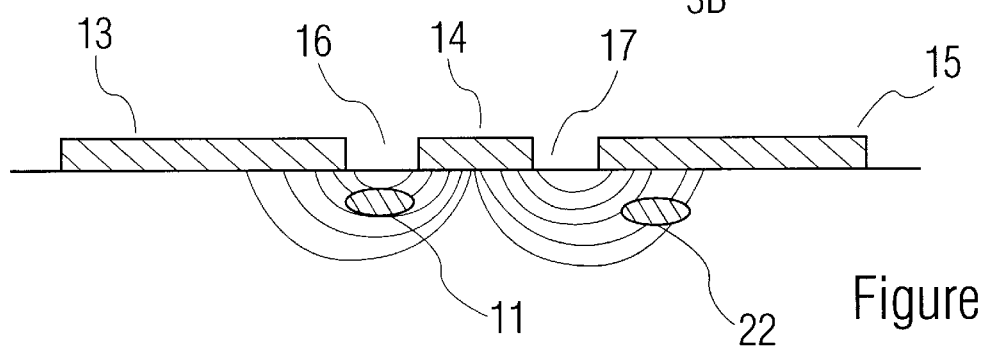

FIGS. 3A and 3B show an alternative modulator arrangement, where the electrodes 13, 14 and 15, and the gaps 16 and 17 therebetween are as shown in FIG. 1B. The waveguide section 11 is disposed with respect to its gap 16 as in FIG. 1B, but waveguide section 22 is displaced laterally of the gap 17. In this way, the waveguide section 22 lies in a different electric field as compared to waveguide section 11, when a single driving voltage is applied across electrode 14 and common electrodes 13 and 15. Consequently, a defined non-zero, non-unity chirp will be obtained, as with the arrangement of FIGS. 2A and 2B.

While specific embodiments of the invention have been shown and described in detail to illustrate the application of the principles of the invention, it will be understood that the invention may be embodied otherwise without departing from such principles.

I claim:

1. An integrated optical modulator having an optical waveguide which, for part of its length, is divided into two waveguide substantially linear sections arranged logically in parallel whereby incoming light is divided into the waveguide sections and is then recombined after passing therealong, a pair of electrodes for each waveguide section arranged with a respective gap between the electrodes of each pairs whereby respective electric fields may be generated and through which the respective waveguide sections extend, one of the gap between the respective electrodes of each pair thereof and the physical disposition of the waveguide sections relative to the respective gaps differing such that the electric fields to which light propagated along the two waveguide sections are subjected are different when the pairs of electrodes are driven with substantially the same voltage.

2. An integrated optical modulator as claimed in claim 1, wherein the arrangement of the pair of electrodes associated with one waveguide sections differs from the arrangement of the electrodes associated with the other waveguide sections.

3. An integrated optical modulator as claimed in claim 2, wherein the gap between the two electrodes of one pair is different from the gap between the two electrodes of the other pair whereby different electric fields lie between the respective pairs of electrodes, for common driving voltage.

4. An integrated optical modulator as claimed in claim 2, wherein the arrangement of the pairs of electrodes and the gaps therebetween are essentially the same, each waveguide section extends substantially parallel to the gap between its pair of electrodes, for the greater part of the respective waveguide section, and the part of the electric field within which the each waveguide section lies is different for the two waveguide sections.

5. An integrated optical modulator as claimed in claim 4, wherein one waveguide section is offset laterally with respect to the gap between its associated electrodes, and the other waveguide section is disposed substantially centrally with respect to the gap between its associated electrodes.

6. An integrated optical modulator as claimed in claim 1, wherein the waveguide sections and the electrodes are arranged as a Mach-Zehnder interferometer.

7. An integrated optical modulator as claimed in claim 1, wherein one electrode of each said pair of electrodes is common to both pairs of electrodes.

8. An integrated optical modulator as claimed in claim 7, wherein the other electrode of one pair is electrically connected to the other electrode of the other pair.

9. A modulator system comprising an integrated optical modulator as claimed in claim 1, a laser light source providing a fixed wavelength unmodulated light signal to the modulator, and driving means connected to the electrodes of the modulator and arranged to apply substantially the same modulating drive voltage to the pairs of electrodes associated with the two waveguide sections respectively.

10. A modulator system as claimed in claim 9, wherein one electrode of each pair is common to both pairs of electrodes, the other electrodes of both pairs are connected together, and the driving means comprises a single drive source which applies a drive voltage across the one electrode and the connected-together other electrodes.

11. An integrated optical modulator as claimed in claim 5, wherein one electrode of each said pair of electrodes is common to both pairs of electrodes.

12. An integrated optical modulator as claimed in claim 11, wherein the other electrode of one pair is electrically connected to the other electrode of the other part.

13. A method of controlling the chirp of an integrated optical modulator having an optical waveguide which, for part of its length, is divided into two substantially linear waveguide sections arranged logically in parallel so that incoming light is divided into the waveguide sections and then is recombined after passing therealong, each waveguide section having a respective pair of electrodes associated therewith and having a respective gap therebetween to generate an electric field through which the respective waveguide section extends, one of the gap between the respective electrodes of each pair thereof and the physical disposition of the waveguide sections relative to the respective gaps differing, in which method both pairs of electrodes are driven with the substantially same voltage but the two waveguide sections being subjected to different electric fields having regard to the differing arrangement of the waveguide sections and the electrodes associated therewith.

* * * * *